United States Patent
McCaffrey

(10) Patent No.: US 10,364,706 B2
(45) Date of Patent: Jul. 30, 2019

(54) METER PLATE FOR BLADE OUTER AIR SEAL

(71) Applicant: UNITED TECHNOLOGIES CORPORATION, Farmington, CT (US)

(72) Inventor: Michael G. McCaffrey, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 483 days.

(21) Appl. No.: 15/106,121

(22) PCT Filed: Dec. 17, 2014

(86) PCT No.: PCT/US2014/070831
§ 371 (c)(1),
(2) Date: Jun. 17, 2016

(87) PCT Pub. No.: WO2015/138027
PCT Pub. Date: Sep. 17, 2015

(65) Prior Publication Data
US 2016/0319841 A1    Nov. 3, 2016

Related U.S. Application Data

(60) Provisional application No. 61/916,975, filed on Dec. 17, 2013.

(51) Int. Cl.
*F04D 29/58* (2006.01)
*F01D 25/12* (2006.01)
(Continued)

(52) U.S. Cl.
CPC ............ *F01D 25/246* (2013.01); *F01D 11/08* (2013.01); *F01D 11/24* (2013.01); *F01D 25/12* (2013.01);
(Continued)

(58) Field of Classification Search
CPC ........ F01D 11/08; F01D 25/28; F01D 25/246; F01D 11/24; F01D 25/12; F01D 25/14;
(Continued)

(56) References Cited

U.S. PATENT DOCUMENTS 3,603,599 A * 9/1971 Laird .................... F01D 11/127
277/414
3,966,353 A    6/1976 Booher, Jr. et al.
(Continued)

FOREIGN PATENT DOCUMENTS

EP    1124039 A1    8/2001
EP    2093384 A2    8/2009
(Continued)

OTHER PUBLICATIONS

Extended European Search Report for European Patent Application No. 14885713.9 completed Aug. 11, 2017.

*Primary Examiner* — Carlos A Rivera
*Assistant Examiner* — Justin A Pruitt
(74) *Attorney, Agent, or Firm* — Carlson, Gaskey & Olds, P.C.

(57) ABSTRACT

One exemplary embodiment according to this disclosure relates to a system includes a blade outer air seal (BOAS), and a meter plate. A portion of the meter plate is provided radially outward of a radially outermost surface of the BOAS.

11 Claims, 4 Drawing Sheets

(51) Int. Cl.
*F01D 25/24* (2006.01)
*F04D 29/16* (2006.01)
*F01D 11/08* (2006.01)
*F01D 11/24* (2006.01)

(52) U.S. Cl.
CPC ......... *F04D 29/164* (2013.01); *F04D 29/582* (2013.01); *F05D 2230/64* (2013.01); *F05D 2240/11* (2013.01); *F05D 2260/201* (2013.01); *Y02T 50/672* (2013.01); *Y02T 50/676* (2013.01)

(58) Field of Classification Search
CPC ............... F04D 29/164; F05D 2230/64; F05D 2240/11; F05D 2260/201; Y02T 50/672; Y02T 50/676
USPC ......................................................... 415/116
See application file for complete search history.

(56) References Cited

U.S. PATENT DOCUMENTS

| | | |
|---|---|---|
| 4,222,707 A | 9/1980 | Drouet et al. |
| 4,337,016 A | 6/1982 | Chaplin |
| 5,273,396 A | 12/1993 | Albrecht et al. |
| 5,423,659 A | 6/1995 | Thompson |
| 5,486,090 A | 1/1996 | Thompson |
| 5,538,393 A | 7/1996 | Thompson et al. |
| 5,964,575 A * | 10/1999 | Marey .................... F01D 25/12 415/115 |
| 6,146,091 A | 11/2000 | Watanabe et al. |
| 6,393,331 B1 | 5/2002 | Chetta et al. |
| 7,597,533 B1 | 10/2009 | Liang |
| 7,704,039 B1 | 4/2010 | Liang |
| 8,206,087 B2 | 6/2012 | Campbell et al. |
| 8,303,247 B2 | 11/2012 | Schlichting et al. |
| 2003/0131980 A1 | 7/2003 | DeMarche et al. |
| 2009/0208322 A1 | 8/2009 | McCaffrey |
| 2013/0108416 A1 | 5/2013 | Piggush et al. |
| 2013/0170963 A1 | 7/2013 | Mironets et al. |

FOREIGN PATENT DOCUMENTS

| | | |
|---|---|---|
| EP | 1134360 A2 | 9/2009 |
| EP | 2166194 A2 | 3/2010 |
| EP | 2336497 A2 | 6/2011 |
| FR | 2540937 A1 | 8/1984 |

* cited by examiner

METER PLATE FOR BLADE OUTER AIR SEAL

BACKGROUND

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. An engine case may support one or more blade outer air seals (BOAS), which establish an outer flow path boundary for channeling the hot combustion gasses. Due to their close proximity to the hot combustion gases, a cooling flow of fluid is provided to the BOAS and engine case in some examples.

SUMMARY

One exemplary embodiment according to this disclosure relates to a system includes a blade outer air seal (BOAS), and a meter plate. A portion of the meter plate is provided radially outward of a radially outermost surface of the BOAS.

In a further embodiment of any of the above, the BOAS includes a base, a fore surface, an aft surface, and a trough between the base, the fore surface, and the aft surface. Further, the meter plate has a flow restriction surface radially outward of the trough, the flow restriction surface including a plurality of orifices.

In a further embodiment of any of the above, a flow distributor extends radially inward from the flow restriction surface into the trough.

In a further embodiment of any of the above, the flow distributor is one of a bathtub, a baffle, a fin, and a hat.

In a further embodiment of any of the above, the flow distributor is a bathtub, the bathtub including a fore surface, an aft surface, and a base surface, the bathtub having a contour substantially corresponding to a contour of the trough.

In a further embodiment of any of the above, the fore surface, the aft surface, and the base surface of the bathtub each include orifices.

In a further embodiment of any of the above, the BOAS includes first and second slots at opposite circumferential sides of the BOAS, and the meter plate includes first and second attachment tabs at least partially received in the first and second slots, respectively.

Another exemplary embodiment according to this disclosure relates to a meter plate for a blade outer air seal (BOAS). The meter plate includes a flow restriction surface including a plurality of orifices, and a flow distributor extending from the flow restriction surface.

In a further embodiment of any of the above, the wherein the flow distributor is one of a bathtub, a baffle, a fin, and a hat.

In a further embodiment of any of the above, the flow distributor is a bathtub, the bathtub including a fore surface, an aft surface, and a base, wherein the fore surface, the aft surface, and the base each include orifices.

In a further embodiment of any of the above, the flow distributor is a hat, the hat including surface substantially perpendicular to an axis of an orifice in the flow restriction surface.

In a further embodiment of any of the above, the flow distributor is a fin, the fin including a surface substantially parallel to an axis of an orifice in the flow restriction surface.

In a further embodiment of any of the above, the flow distributor includes a plurality of orifices.

In a further embodiment of any of the above, the meter plate includes a first attachment tab and a second attachment tab, the first and second attachment tabs extending from opposite ends of the flow restriction surface.

In a further embodiment of any of the above, the meter plate includes at least one centering tab extending from the flow restriction surface.

A further embodiment of this disclosure relates to a gas turbine engine. The engine includes a compressor section, a combustor section, and a turbine section. Further included is an engine case provided in at least one of the compressor section and the turbine section, a blade outer air seal (BOAS) provided radially inward of the engine case, and a meter plate. A portion of the meter plate is provided between a radially outermost surface of the BOAS and the engine case.

In a further embodiment of any of the above, the BOAS includes a base, a fore surface, an aft surface, and a trough between the base, the fore surface, and the aft surface, wherein the meter plate has a flow restriction surface radially outward of the trough, the flow restriction surface including a plurality of orifices.

In a further embodiment of any of the above, the a flow distributor extends radially inward from the flow restriction surface into the trough.

In a further embodiment of any of the above, the meter plate includes at least one centering tab, the centering tab projecting radially outward from the meter plate, the centering tab provided adjacent a lug of the engine case.

In a further embodiment of any of the above, the meter plate includes at least one centering tab, the centering tab projecting radially outward from the meter plate, the centering tab received in a slot of the engine case.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
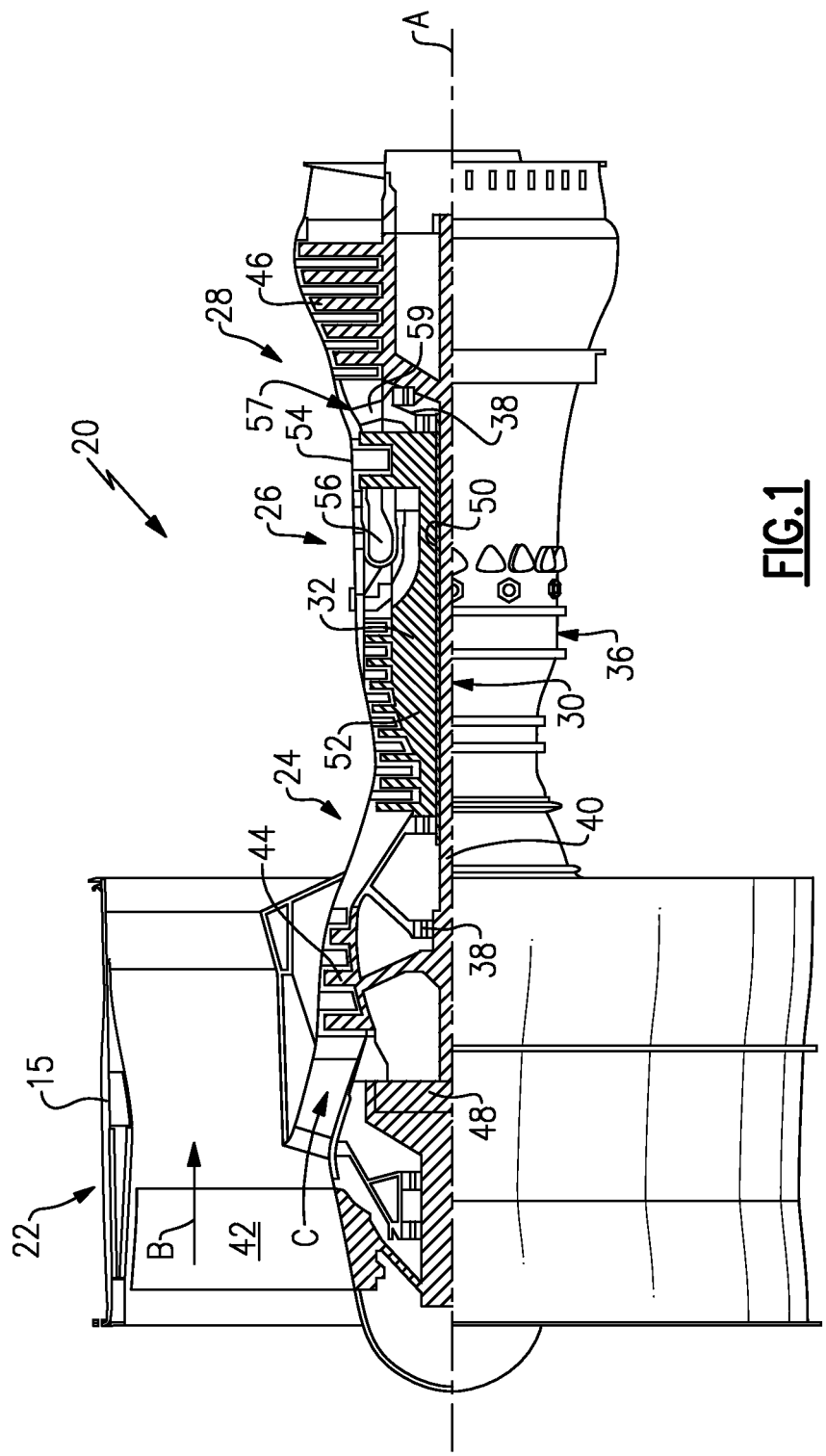
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
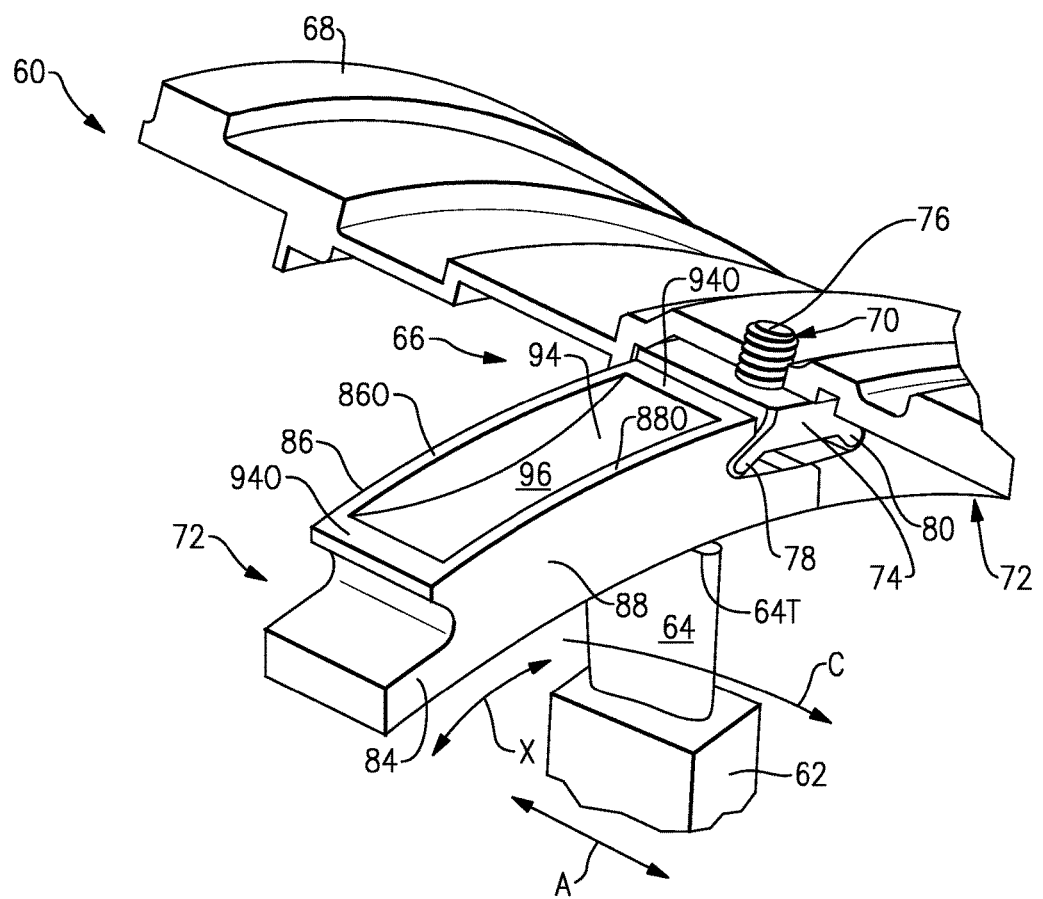
FIG. 2 illustrates a portion of the example engine of FIG. 1.

FIG. 2 is a perspective view of a portion 60 of the gas turbine engine 20 of FIG. 1. In this embodiment, the portion 60 is a portion of the high pressure turbine 54. It should be understood, however, that other portions of the gas turbine engine 20 may benefit from the teachings of this disclosure, including but not limited to the fan section 22, the compressor section 24, and the low pressure turbine 46.

In this embodiment, a rotor disc 62 (only one shown, although multiple discs could be disposed within the portion 60) is configured to rotate about the engine central longitudinal axis A. The portion 60 includes an array of rotating blades 64 (only one shown), which are mounted to the rotor disc 62, and arrays of static vane assemblies (not shown) on axial sides of the blades 64.

Each blade 64 includes a blade tip 64T at a radially outermost portion thereof. The rotor disc 62 is arranged such that the blade tips 64T are located adjacent a blade outer air seal (BOAS) assembly 66. The BOAS assembly 66 may find beneficial use in many industries including aerospace, industrial, electricity generation, naval propulsion, pumps for gas in oil transmission, aircraft propulsion, vehicle engines and stationary power plants.

The BOAS assembly 66 is disposed radially between an engine case 68 (such as an outer casing of the engine 20) and the blade tips 64T. The BOAS assembly 66 includes a support structure 70 and a plurality of BOAS segments 72. The BOAS segments 72 may be arranged to form a full ring hoop assembly that circumferentially surrounds the associated blades 64, which provides a sealing surface for the blade tips 64T to prevent leakage of the core airflow C over to the blades 64. For ease of reference, the individual BOAS segments 72 may be referred to individually as a "BOAS segment" or simply a "BOAS."

In this example, the support structure 70 includes a retention block 74 fastened to the engine case 68 by a fastener 76. The retention block 74 includes tapered arms 78, 80 on circumferentially opposed sides thereof. The tapered arms 78, 80 in this example are rounded, and are to be received within a corresponding curved end of a respective BOAS segment 72 (as will be explained below).

Figure 3:
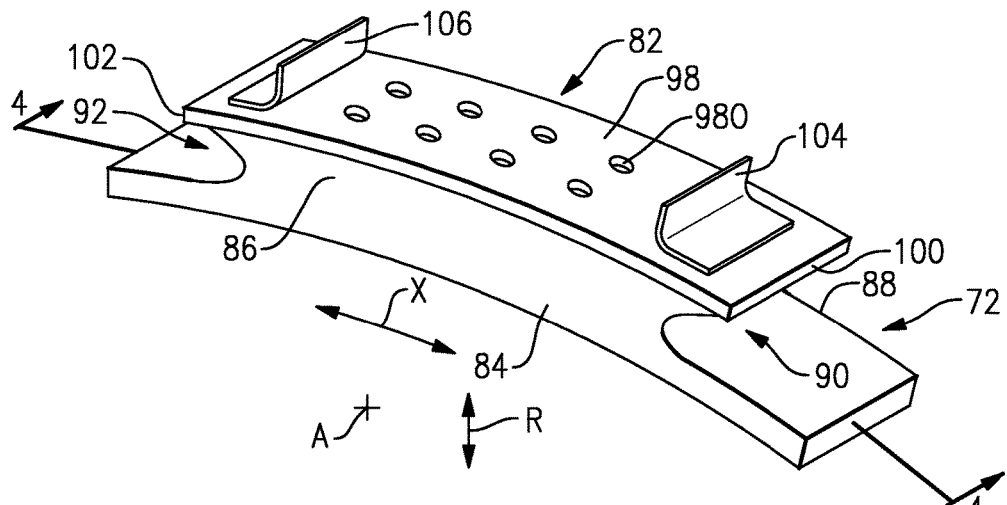
FIG. 3 is a perspective view of an example BOAS and a meter plate according to this disclosure.

While not illustrated in FIG. 2 for ease of reference, the BOAS assembly 66 further includes a meter plate 82 in one example. FIG. 3 illustrates an example meter plate 82 arranged relative to a BOAS segment 72.

Figure 4:
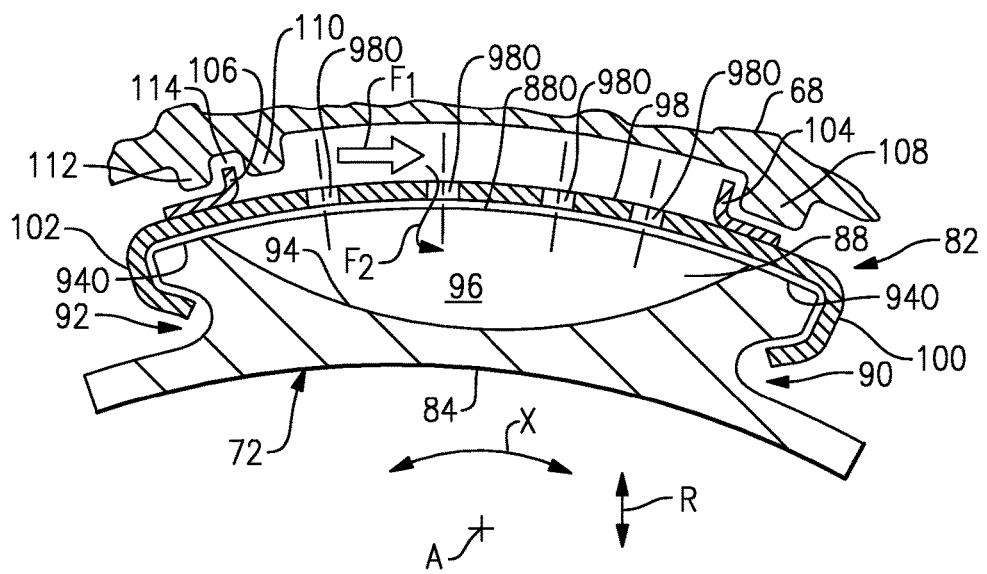
FIG. 4 is a view taken along line 4-4 from FIG. 3.

With reference to FIGS. 3-4, the BOAS segment 72 includes a base 84, a fore surface 86, and an aft surface 88. The base 84 extends circumferentially, in the circumferential direction X, between first and second slots 90, 92 at opposite circumferential sides of the BOAS segment 72. The slots 90, 92 receive the tapered arms 78, 80 of the retention block 74, in one example. The fore and aft surfaces 86, 88 extend from the base 84 to a radially outermost surface of the BOAS segment 72. This radially outermost surface of the BOAS segment is illustrated at 860, 880, and 940 in FIGS. 2 and 4.

The BOAS segment 72 includes a bridge 94 extending circumferentially between the first and second slots 90, 92. Moving from right to left in FIG. 4, the bridge 94 begins at a radially outermost surface 940 adjacent the first slot 90, and moves radially inward toward the engine central longitudinal axis A, before extending radially outward again to the radially outermost surface 940 adjacent the second slot 92. The bridge 94, the fore surface 86, and the aft surface 88 define a trough 96. In this example, the trough 96 is a blind opening facing radially outwardly, toward the engine case 68. While a particular BOAS segment 72 is illustrated, it should be understood that this disclosure extends to other types of BOAS segments.

With reference to FIG. 4, in one example, a cooling flow of fluid $F_1$ is directed between the engine case 68 and the BOAS segment 72. In some examples, it is possible for the BOAS segment 72, which may be ceramic, to reach relatively high temperatures (e.g., on the order of 2,400° F.)

during engine operation. While these high temperatures may be acceptable for a ceramic material, the proximity of the BOAS segment 72 to the surrounding engine case 68, which may be metal, may cause the engine case 68 to reach an undesirably high temperature during engine operation. Among other things, the meter plate 82 regulates the flow of fluid $F_1$ to optimize cooling of the engine case 68 and the BOAS segment 72.

With reference back to FIG. 3, the meter plate 82 includes a flow restriction surface 98 that, in this example, circumferentially spans the BOAS segment 72 between the first slot 90 and the second slot 92. The flow restriction surface 98 includes a plurality of orifices 980 for regulating a flow of fluid to the trough 96 (discussed below). The flow restriction surface 98 is also provided over the radially outermost surfaces 860, 880 and 940 of the BOAS. The meter plate 82 does not require orifices, however, and instead could take the form of a radiation shield.

Adjacent the first and second slots 90, 92, the meter plate 82 includes first and second attachment tabs 100, 102, which extend radially inward from the flow restriction surface 98 and into the slots 90, 92. The first and second attachment tabs 100, 102 may be positioned between the slots 90, 92 and a retention block 72, in one example. Further, in some examples, a compliant layer may be provided between the meter plate 82 and the BOAS segment 72.

The meter plate 82 may further include at least one centering tab. In this example, the meter plate 82 includes two centering tabs 104, 106 extending radially outward from the flow restriction surface 98. A first centering tab 104 is provided adjacent a lug 108 in the engine case 68. The centering tab 104 abuts the lug 108 to limit circumferential movement of the meter plate 82 and, in turn, the BOAS segment 72.

The engine case 68 further includes, in this example, first and second lugs 110, 112 defining a slot 114 therebetween. The second centering tab 106 is received in slot 114 to, again, limit circumferential movement of the BOAS segment 72. It should be understood that additional centering tabs may be included. While the retention block 74 substantially limits the circumferential movement of the BOAS segment 72, the centering tabs 104, 106 may provide additional circumferential restriction.

In this example, the BOAS segment 72 may be formed of a ceramic material. In one example, the BOAS segment 72 is formed of a ceramic matrix composite material, while in another example the BOAS segment 72 is formed of a monolithic ceramic material. The meter plate 82 may be formed of a ceramic matrix composite, a cobalt alloy, a nickel alloy, or another material suitable to the environment. The various structures associated with the meter plate 82 may be formed integrally, during a single manufacturing process, or formed separate from one another and then attached together (e.g., by welding).

As generally mentioned, during operation of the engine 20, a cooling flow of fluid $F_1$ may be directed between the engine case 68 and the BOAS segment 72 to cool the BOAS segment 72. A plurality of orifices 980 are formed in the flow restriction surface 98 to restrict the amount of cooling flow $F_1$ that will enter the trough 96. The size and number of orifices 980 can be selected depending on a desired level of cooling.

As illustrated in FIG. 4, the orifices 980 allow only a portion $F_2$ of the cooling flow $F_1$ to enter the trough 96. This optimizes the allocation of the cooling flow $F_1$ as the engine case 68, which is typically made of a metal material, may require more cooling than the ceramic BOAS segment 72.

Further, overcooling the BOAS segment 72 may result in shrinkage of the BOAS segment 72, reducing the ability of the BOAS to establish radial flow path boundary around the adjacent turbine blades 64.

Figure 5:
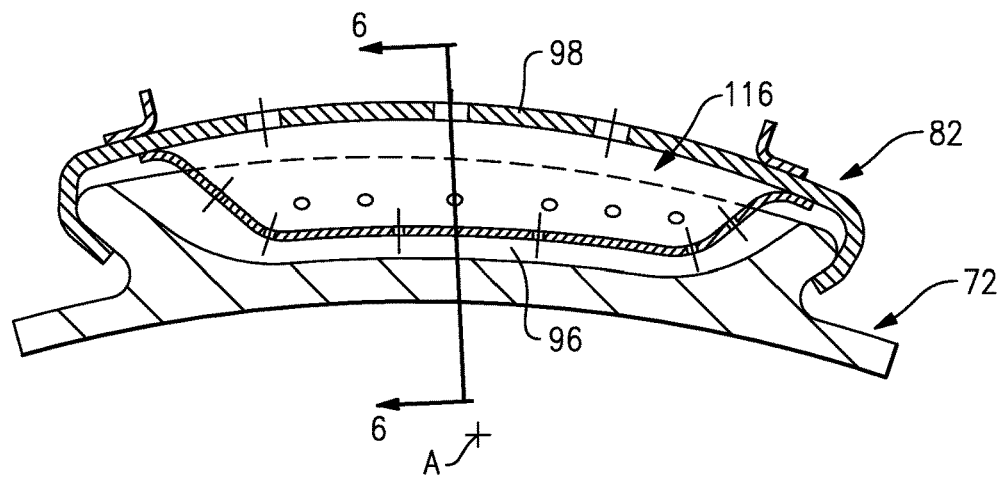
FIG. 5 illustrates another example meter plate according to this disclosure.
Figure 6:
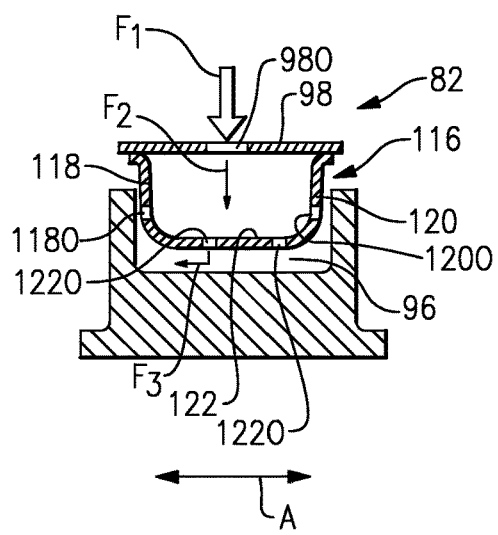
FIG. 6 is a cross-sectional view taken along line 6-6 from FIG. 5.

In some examples of this disclosure, the meter plate 82 may include one or more flow distributors extending from the flow restriction surface 98. FIGS. 5 and 6 illustrate an example where the BOAS segment 82 includes a flow distributor referred to herein as a "bath tub" 116. As illustrated in FIG. 6, the bath tub 116 includes a fore surface 118, an aft surface 120 and a base 122. The contour of the bath tub 116 substantially matches the contour of the trough 96. In this example, the fore surface 118, the aft surface 120 and the base 122 each include orifices 1180, 1200 and 1220 for further restricting the flow of fluid $F_2$ from the orifices 980, and for distributing fluid relative to the trough 96 for a desired cooling effect, as generally illustrated at $F_3$.

Figure 7:
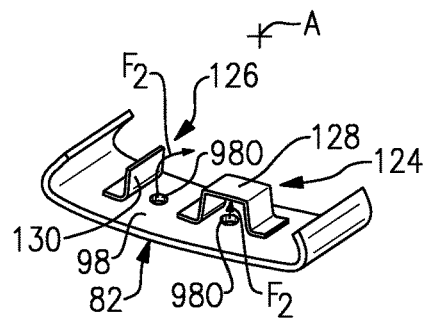
FIG. 7 illustrates yet another example meter plate according to this disclosure.

While a bath tub 116 is illustrated in FIGS. 5 and 6, it should be understood that other types of flow distributors come within the scope of this disclosure. For instance, as illustrated in FIG. 7, the meter plate 82 may include a "hat" 124 and/or a "fin" 126. These flow distributors can be used in combination with one another, or separate from one another depending on a desired cooling effect.

In the example of FIG. 7, the hat 124 includes a plate 128 substantially perpendicular to an axis of the orifice 980, and spaced radially inward from the orifice 980. The plate 128 essentially spreads the fluid $F_2$ as it contacts the plate 128. The fin 126 includes a plate 130 substantially parallel to the axis of the orifice 980, and essentially prevents the flow of fluid $F_2$ from flowing beyond the plate 130. Again, while various flow distributors are illustrated in FIGS. 5-7, it should be understood that additional flow distributors come within the scope of this disclosure. Further, as in the embodiment of FIGS. 3 and 4, a flow distributor is not required.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "substantially" and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A system, comprising:
   a ceramic blade outer air seal (BOAS), wherein the BOAS includes a base, a fore surface, an aft surface, and a trough between the base, the fore surface, and the aft surface;
   a meter plate, a portion of the meter plate provided radially outward of a radially outermost surface of the BOAS, wherein the meter plate has a flow restriction surface radially outward of the trough, the flow restriction surface including a plurality of orifices; and a flow distributor extending radially inward from the flow restriction surface into the trough, wherein the flow distributor is a bathtub including a fore surface, an aft surface, a first circumferential side surface between the fore surface and the aft surface, a second circumferential side surface between the fore surface and the aft surface, and a base surface, the bathtub having a contour substantially corresponding to a contour of the trough such that each of the fore, aft, first circumferential side, second circumferential side, and base surfaces are at least partially arranged in the trough, and wherein each of the fore, aft, first circumferential side, second circumferential side, and base surfaces includes orifices.

2. The system as recited in claim 1, wherein the BOAS includes first and second slots at opposite circumferential sides of the BOAS, and wherein the meter plate includes first and second attachment tabs at least partially received in the first and second slots, respectively.

3. The system as recited in claim 1, wherein the BOAS is made of a ceramic matrix composite material.

4. The system as recited in claim 1, wherein the trough defines a blind opening facing radially outwardly toward an engine case.

5. The system as recited in claim 1, wherein the trough is defined in part by a bridge extending from a radially outermost surface of the BOAS adjacent a first circumferential slot of the BOAS, moving gradually radially inward as the bridge approaches a circumferential center of the BOAS, and moving gradually radially outward to the radially outermost surface of the BOAS adjacent a second circumferential slot of the BOAS on an opposite circumferential side of the BOAS as the first circumferential slot.

6. A meter plate for a blade outer air seal (BOAS), comprising:
   a flow restriction surface including a plurality of orifices; and
   a flow distributor extending from the flow restriction surface, wherein the flow distributor is a bathtub including a fore surface, an aft surface, a first circumferential side surface between the fore surface and the aft surface, a second circumferential side surface between the fore surface and the aft surface, and a base surface, the bathtub having a contour substantially corresponding to a contour of a trough of the BOAS such that each of the fore, aft, first circumferential side, second circumferential side, and base surfaces are at least partially arranged in the trough, and wherein each of the fore, aft, first circumferential side, second circumferential side, and base surfaces includes orifices.

7. The meter plate as recited in claim 6, wherein the meter plate includes a first attachment tab and a second attachment tab, the first and second attachment tabs extending from opposite ends of the flow restriction surface.

8. The meter plate as recited in claim 6, wherein the meter plate includes at least one centering tab extending from the flow restriction surface.

9. A gas turbine engine, comprising:
   a compressor section, a combustor section, and a turbine section;
   an engine case provided in at least one of the compressor section and the turbine section;
   a ceramic blade outer air seal (BOAS) provided radially inward of the engine case wherein the BOAS includes a base, a fore surface, an aft surface, and a trough between the base, the fore surface, and the aft surface;
   a meter plate, a portion of the meter plate provided between a radially outermost surface of the BOAS and the engine case, wherein the meter plate has a flow restriction surface radially outward of the trough, the flow restriction surface including a plurality of orifices; and
   a flow distributor extending radially inward from a flow restriction surface into the trough, wherein the flow distributor is a bathtub including a fore surface, an aft surface, a first circumferential side surface between the fore surface and the aft surface, a second circumferential side surface between the fore surface and the aft surface, and a base surface, the bathtub having a contour substantially corresponding to a contour of the trough such that each of the fore, aft, first circumferential side, second circumferential side, and base surfaces are at least partially arranged in the trough, and wherein each of the fore, aft, first circumferential side, second circumferential side, and base surfaces includes orifices.

10. The gas turbine engine as recited in claim 9, wherein the meter plate includes at least one centering tab, the centering tab projecting radially outward from the meter plate, the centering tab provided adjacent a lug of the engine case.

11. The gas turbine engine as recited in claim 9, wherein the meter plate includes at least one centering tab, the centering tab projecting radially outward from the meter plate, the centering tab received in a slot of the engine case.

* * * * *